United States Patent [19]
Gallo et al.

[11] Patent Number: 5,208,879
[45] Date of Patent: May 4, 1993

[54] OPTICAL SIGNAL DISTRIBUTION SYSTEM

[75] Inventors: Antonio R. Gallo, Pleasant Valley; Gordon J. Robbins, Wappingers Falls; Robert R. Shaw, Poughkeepsie, all of N.Y.

[73] Assignee: International Business Machines Corporation, Armonk, N.Y.

[21] Appl. No.: 779,428

[22] Filed: Oct. 18, 1991

[51] Int. Cl.⁵ .......................... G02B 6/10; G02B 6/12; G02B 6/36
[52] U.S. Cl. ...................................................... 385/14
[58] Field of Search ..................................... 385/13–15

[56] References Cited

U.S. PATENT DOCUMENTS

| | | | |
|---|---|---|---|
| 4,762,382 | 8/1988 | Husain et al. | 385/14 X |
| 4,809,358 | 2/1989 | Fernstrom | 385/14 X |
| 4,854,659 | 8/1989 | Hamerslag et al. | 385/14 |
| 4,969,712 | 11/1990 | Westwood et al. | 385/14 |
| 4,989,934 | 2/1991 | Zavracky et al. | 385/14 |
| 5,009,476 | 4/1991 | Reid et al. | 385/14 |
| 5,026,134 | 6/1991 | Sugawara et al. | 385/14 X |
| 5,054,870 | 10/1991 | Losch et al. | 385/14 |

OTHER PUBLICATIONS

Research Disclosure entitled "Flexible Interposing Carrier Scheme for Optical Waveguides", Jul. 1989, No. 303.

"Low Loss Channel Waveguides in Polymers" by Bruce L. Booth, Journal of Lightwave Technology, vol. 7, #10, Oct. 1989.

Primary Examiner—Akm E. Ullah
Attorney, Agent, or Firm—Ira David Blecker

[57] ABSTRACT

Disclosed is an optical signal distribution system. The system comprises an electronic substrate, at least one optical component and at least one optical waveguide on but distinct from the electronic substrate for carrying an optical signal to or from the optical component.

19 Claims, 3 Drawing Sheets

OPTICAL SIGNAL DISTRIBUTION SYSTEM

BACKGROUND OF THE INVENTION

The present invention is related to the field of optical signal distribution and, more particularly, to optical signal distribution through an optical waveguide on an electronic substrate where the optical waveguide is not integral with the electronic substrate.

Optical signal distribution in computers has in recent years been pursued as an attractive alternative and supplement to traditional signal distribution through electrical circuits. As the quest for faster and smaller computers has intensified, the limits of electronic signal distribution have become apparent. Speed is limited by the material of conductors and connectors because of the signal distortion they cause. Higher circuit and wiring densities as well as operating voltage levels magnify and increase problems related to electromagnetic interference (EMI). Optical signals, however, can often travel faster than electrical signals, have a larger bandwidth and are almost insensitive to EMI. An additional advantage of optical signals is that they are less vulnerable to security violations.

Optical signal distribution is generally achieved using optical fiber, optical waveguides or a combination of the two. Both optical fiber and optical waveguides perform the same basic function of guiding light, but the requirements of the specific applications in which they are used are different. Optical fiber, which can be glass or plastic, is typically intended to carry light signals over relatively long distances in environments that may subject it to significant physical stresses. It is cylindrically shaped to minimize attenuation (sharp edges tend to lose light) and coated with buffer layers to maximize robustness. Waveguides, in contrast, are normally intended to carry light signals over relatively short distances in less hostile environments. Because attenuation is less important in short distance connections, and buffer layers are less important in a protected environment, waveguides can be very thin and flat. Because of their reduced bulk, waveguides take up less space than fiber, can be made to bend around corners, and make multiple connections more easily than fiber. These characteristics favor waveguides over fiber for some applications on electronic substrates.

Polymer waveguides in particular are currently being pursued as a low-cost, reliable technique for optical signal distribution between integrated circuit chips on an electronic substrate. Polymer waveguides are typically formed monolithically in single layers using various doping and etching methods in combination with photolithography techniques. These methods are disclosed in more detail in B. Booth, "Low Loss Channel Waveguides in Polymers", The Journal of Lightwave Technology, Vol. 7, pp. 1445-1453, 1989. Waveguides formed in this manner are generally not self-standing and require dedicated space on the surface of the electronic circuit substrate.

Also disclosed in the article referenced in the preceding paragraph is a self-standing multilayered waveguide structure wherein the waveguide is formed as an integral part of the layers by polymerization driven diffusion. The layers are formed from monomers which polymerize when exposed to light. A mask is used to control which portions of the layers are exposed. Monomer diffusions triggered during polymerization create regions of higher refractive index which behave as a waveguide.

Disclosed in IBM Research Disclosure No. 303, "Flexible Interposing Carrier Scheme for Optical Waveguides" (July 1989), is a flexible waveguide structure for connecting optical sources and sinks (devices). The structure can be overlaid on the devices and then optical connections can be made between the flexible waveguide structure and devices.

It is an object of this invention to provide an optical signal distribution system which routes optical waveguides between integrated circuit chips without requiring dedicated space on a circuit substrate.

It is another object of this invention to provide an optical signal distribution system which routes multiple layers of optical waveguides between integrated circuit chips without requiring dedicated space on a circuit substrate.

It is yet another object of this invention to provide an optical signal distribution system in which the waveguide is provided as a preform to the surface of the electronic substrate.

It is still another object of this invention to provide an optical signal distribution system which is removable, thereby rendering the electronic substrate re-workable.

It is still another object of this invention to provide a signal distribution system that is substantially insensitive to electromagnetic interference.

BRIEF SUMMARY OF THE INVENTION

According to the invention, disclosed is an optical signal distribution system. The system comprises an electronic substrate having a principal surface with at least one optical component on the principal surface and at least one optical waveguide distinct from the electronic substrate through which an optical signal can be passed to or from the optical component. The optical waveguide may be placed directly on the electronic substrate or may be part of a layered alignment carrier structure which is on but distinct from the electronic substrate.

DETAILED DESCRIPTION OF THE INVENTION

Figure 1:
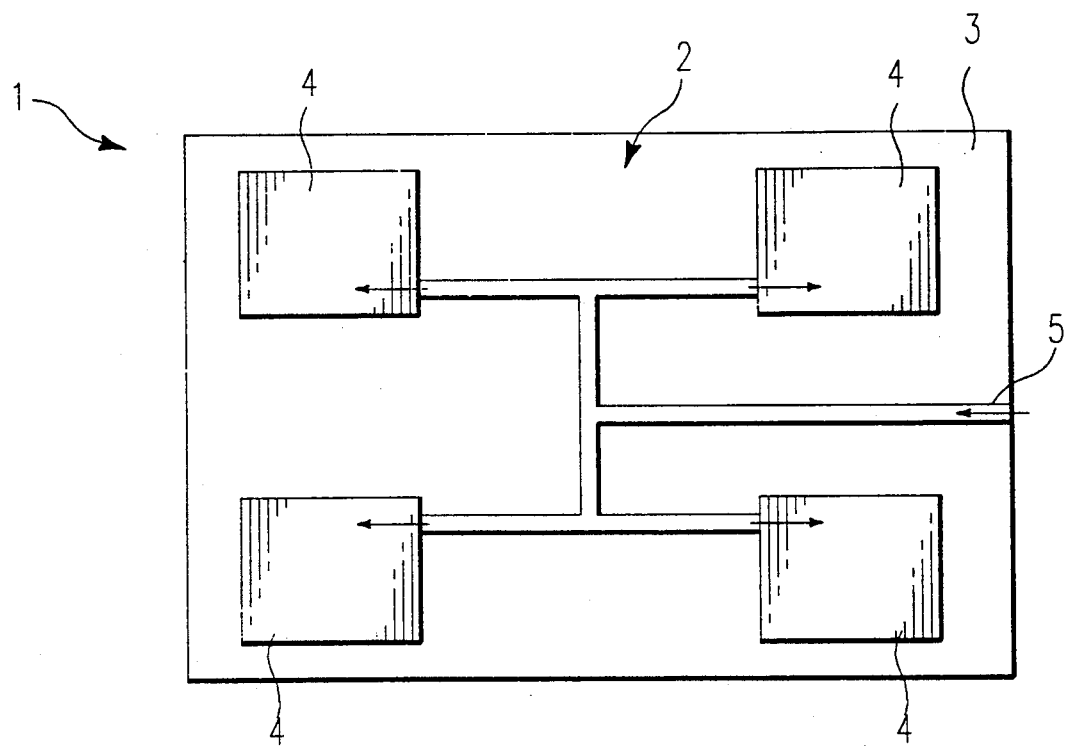
FIG. 1 is a schematic view of the optical signal distribution system according to the invention.

Referring to the drawings in more detail, and particularly referring to FIG. 1, disclosed according to the invention is an optical signal distribution system 1 (hereinafter just "system"). The system 1 comprises an electronic substrate 2 which may be, for example, glass, ceramic or glass-ceramic. The electronic substrate 2 has a principal surface 3. Principal surface 3 is normally used to hold integrated circuit chips, electronic components and electrical wiring between the chips and electronic components. For the sake of clarity, these chips, electronic components and wiring are not shown in FIG. 1.

System 1 also comprises at least one optical component 4 on principal surface 3, as shown in FIG. 1. The optical component may be an electro-optical receiver, such as a photodiode, an electro-optical transmitter, such as a light emitting diode or a laser, or a purely optical component such as a lens, and may be part of an integrated circuit chip or a discrete device. Hereinafter the term optical component may be used to refer to any of these components. There may also be a plurality of such optical components 4 on substrate 2, depending upon the particular application. For example, there may be a plurality of electro-optical receivers as shown in FIG. 1. Alternatively, there may be a plurality of electro-optical transmitters or a mixture of electro-optical receivers and transmitters. In another possibility, there may be an electro-optical transmitter on one substrate and an electro-optical receiver on another substrate with the two substrates being connected by an optical fiber.

With continued reference to FIG. 1, the system 1 further comprises at least one optical waveguide 5 on but distinct from electronic substrate 2 for carrying an optical signal to or from the optical component 4. The waveguide 5 preferably is a preform which is fabricated independently of the electronic substrate 2 and later applied directly to the electronic substrate 2, like a decal. The optical waveguide 5 can be separated from the electronic substrate 2 mechanically or chemically, as will be described below, to allow efficient re-work of the electronic substrate 2. As is shown in FIG. 1, several connections may be made with one optical waveguide.

Figure 5:
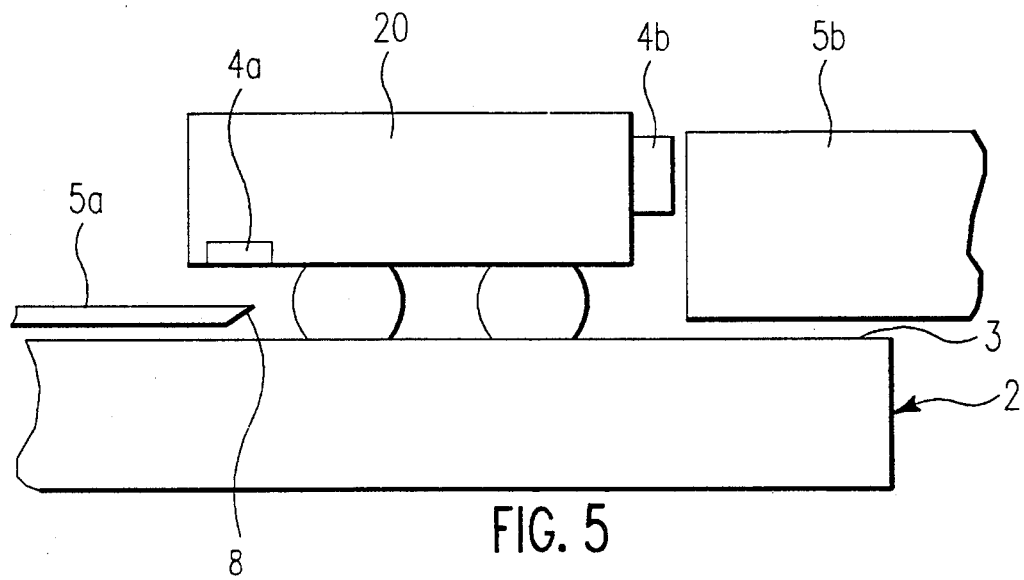
FIG. 5 is a partial cross section of the optical signal distribution system showing methods of coupling the optical waveguide to the optical component.

FIG. 5 illustrates, by way of example two types of connections that may be made between an optical waveguide and an optical component on an electronic substrate. The optical component, which may be on or in integrated circuit chip 20, may be oriented parallel (4a) or perpendicular (4b) to the principal surface 3 of the electronic substrate 2. If the optical component is oriented parallel to the electronic substrate 2, reflection coupling may be used. With this scheme a reflective surface 8 is formed on the waveguide 5a and placed directly below the optical component 4a such that the light is passed between the optical component 4a and the waveguide 5a. If the component device is oriented perpendicular (4b) to the principal surface 3 of the electronic substrate 2, the waveguide may be butt coupled to the optical component 4b by laterally aligning the optical waveguide (5b) to the optical component 4b. In both connection schemes it may be desirable to affix the optical waveguide 5a or 5b to the optical component 4 using optical cement, index matching gel or a suitable substitute. Alternatively, a controlled air gap may be maintained between the optical waveguide 5a or 5b and the optical component 4. For the sake of clarity the optical cement is not shown in FIG. 5.

A variety of materials are believed to make suitable optical waveguides of this type. Some common examples include polyacrylate, polycarbonate, polystyrene and polyimide. The most favorable results observed at the time of this invention were produced using a photosensitive polyimide, for example, CIBA-GEIGY/412. Polymethyl methacrylate is also favored. Glass may also be utilized.

Figure 2:
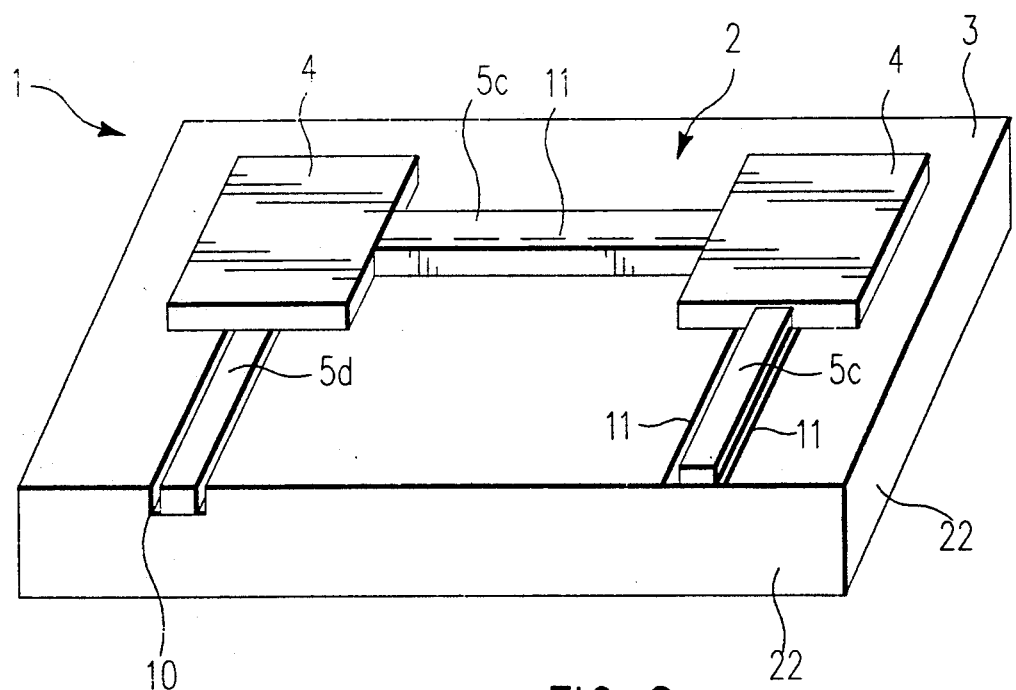
FIG. 2 is a perspective view of the optical signal distribution system showing how the electronic substrate may act as an alignment carrier for optical waveguides.

FIG. 2 illustrates the optical signal distribution system where the electronic substrate acts as an alignment carrier structure. Such a feature may be useful to enhance alignment precision or automation. The optical waveguide 5c may be directly applied to the principal surface 3 of the electronic substrate 2 using either markings 11 made on principal surface 3 or the side surfaces 22 of the electronic substrate 2 as reference features for alignment of the optical waveguide to its optical components. Alternatively, a channel 10 may be formed on or in the electronic substrate 2 to hold and align waveguide 5d. The channel may be formed mechanically or chemically.

Figure 3:
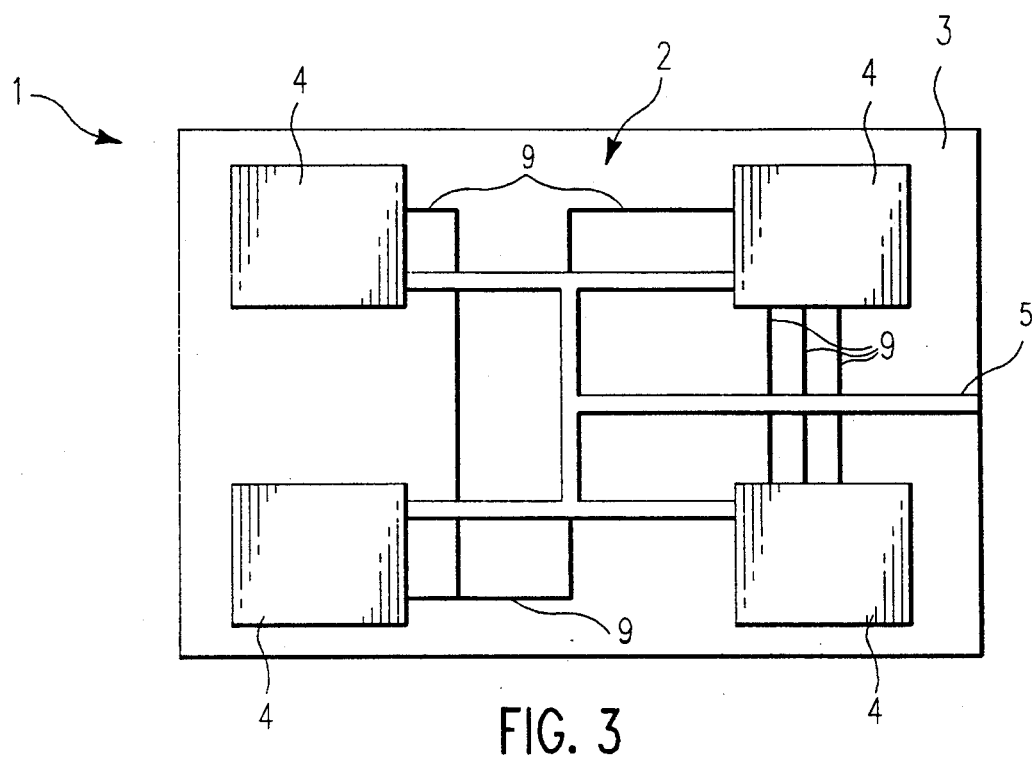
FIG. 3 is a schematic view of the optical signal distribution system and showing the optical waveguide overlaying electrical wiring.

Normally, it is preferable that the optical waveguide be applied directly to the electronic substrate rather than placed in a channel because such a scheme permits space on the electronic substrate to be conserved. As is best shown in FIG. 3, this scheme allows more connections to be made in a given space because the optical waveguide 5 may physically overlay electrical lines 9. Since optical signals are substantially insensitive to EMI, the optical waveguide may be in close proximity to the electrical lines 9 without causing the optical signal to significantly degrade. For other applications where channels are desired for alignment or other purposes, it may be convenient to place the channels around the periphery of the electronic substrate since this area is not normally preferred for routing of electrical signals.

The optical waveguide is preferably applied as a decal thereby making the electronic substrate to which it is applied re-workable. If the optical waveguide is not bonded to the electronic substrate, it may be removed mechanically by lifting it off the substrate. However, it may often be desirable for the optical waveguide to be bonded to the electronic substrate to maintain optical alignment during the useful life of the electronic substrate. Proper selection of waveguide and bonding materials provides a bond sufficiently strong to maintain optical alignment but still permits removal of the bonded optical waveguide without harming the electronic substrate. For example, a polyimide adhesive (e.g. THERMID, available from the National Starch & Chemical Co.) may be used to bond a polyimide waveguide to a ceramic substrate. An appropriate solvent may be used to dissolve the adhesive thus freeing the waveguide from the substrate for easy removal.

The decal may be formed from thin sheets of the polymers previously discussed or from thin sheets of glass. Polymer sheets, which may be stamped, cut or etched to form optical waveguides, are commercially available from DuPont, Amoco, Allied-Signal, Asahi Chemical, Toray, Hitachi Chemical, Ciba-Geigy and ICI. Glass sheets may be cut or chemically etched. The dimensions of the decal necessarily depend upon the locations on the electronic substrate of the optical devices to be connected.

Figure 4:
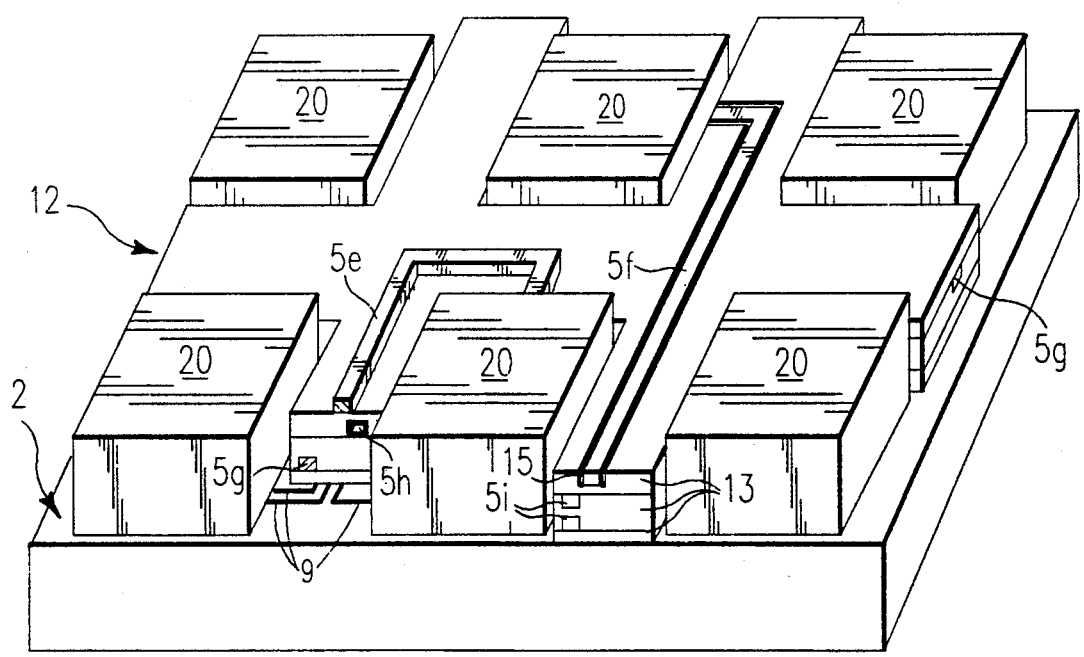
FIG. 4 shows a perspective view of the alignment carrier structure as it is placed over the electronic substrate.

As is shown in FIG. 4 the system may further comprise an independent alignment carrier structure 12 placed over electronic substrate 2. The independent alignment carrier structure allows a plurality of optical waveguides to be simultaneously applied to the electronic substrate and aligned with the appropriate optical components. The shape of the alignment carrier structure will vary depending upon the application. For example, in an application where the chips are arranged in a rectilinear array, such as is shown in FIG. 4, the preferred shape of the alignment carrier structure 12 would be a grid, sized so as to conveniently fit within the grid-like pattern formed by the spaces between adjacent chips 20.

With continued reference to FIG. 4, the alignment carrier structure 12 comprises at least one layer 13 on or within which is placed at least one preformed optical waveguide 5. The optical waveguide 5 is positioned on or in the alignment carrier structure such that it is aligned to the optical components it is intended to connect when the alignment carrier structure is placed over the electronic substrate. Preferably, there will be a plurality of layers 13 for greater utility. The layers 13 of the alignment carrier structure 12 are preferably selected from a group of materials consisting of polymers and glasses which have an index of refraction lower than that of the optical waveguides being used, or alternatively metals which act as reflecting guides.

With continued reference to FIG. 4, the waveguide 5 may be applied to the top or bottom surface of alignment carrier structure 12 as a ridge waveguide 5e. The waveguide 5f may also be embedded in channels 15 formed within layer 13. Alternatively, waveguide 5g may be enclosed between adjacent layers 13. The waveguide 5h may also be formed by metallizing voids within the layers. For example, a channel may be formed in a polymer layer and then coated with metal and covered by another metal-coated polymer layer such that the void created by the channel has a contiguous coating of metal. In this scheme, light travels through air and total internal reflection is achieved by the metallization. Coupling waveguides 5i may also be created within the alignment carrier structure and are discussed in more detail below in reference to FIG. 6.

Still referring to FIG. 4, the alignment carrier structure preferably overlays electrical lines 9 on the electronic substrate 2. The advantages of overlaying the alignment carrier structure on the electrical lines are the same as those mentioned in the discussion of FIG. 3, above, namely, greater density of connections. Additionally, because the alignment carrier structure has several layers of optical waveguides, it permits even more efficient use of space on the electronic substrate.

Figure 6A:
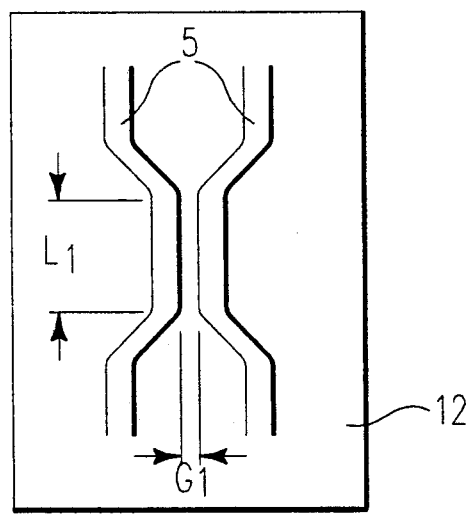
FIG. 6A is a schematic view of lateral optical coupling between waveguides.
Figure 6B:
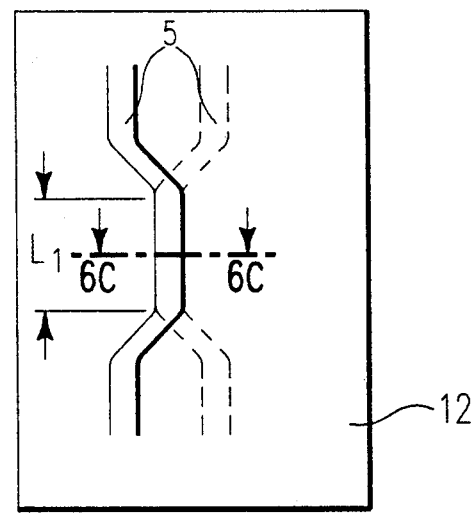
FIG. 6B is a schematic view of vertical optical coupling between waveguides.
Figure 6C:
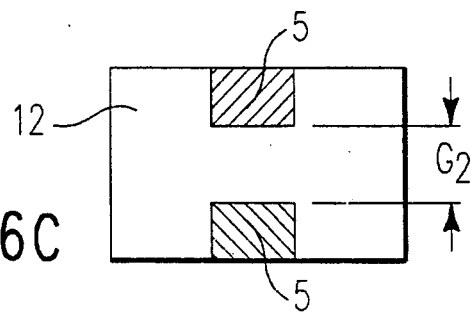
FIG. 6C is a cross section along the line 6C-6C in FIG. 6B of vertical optical coupling between waveguides in the region of optical coupling.

The alignment carrier structure may be used to create directional coupling waveguides. Coupling waveguides are normally formed by varying the lateral gap between adjacent co-planar optical waveguides as is shown in FIG. 6a. The lateral gap G1 between the optical waveguides 5 is much smaller over the distance L1 than over the remaining length of the optical waveguides 5. The light signal in one optical waveguide couples into the adjacent optical waveguide over the length L1 and continues to propagate in the adjacent optical waveguide. A similar technique can be employed between optical waveguides that are not co-planar as can be seen in FIGS. 6B and 6C. The optical waveguide drawn with a dotted line is below the optical waveguide drawn with a solid line. The two optical waveguides are vertically aligned such that they overlap over the length L2. The vertical gap, G2 in FIG. 6C, is sized so as to permit optical coupling from one optical waveguide over the length L2 to the other optical waveguide.

The alignment carrier structure 12 is fabricated by a process comprising a first step of forming the first layer of the alignment carrier structure. This step varies with the material used for the layer, such as polymer, metal or glass. For example, if the material is commercially available in thin pre-made sheets, the layer can be stamped and/or cut from the sheets to the desired shape, such as the preferred rectilinear array and size. Alternatively, the layer can be molded. Either method may be used to incorporate channels into the layer.

The next step in the process for fabricating the alignment carrier structure 12 is positioning at least one optical waveguide on or within the layer just formed. If the layer has a channel, an optical waveguide may be placed in the channel. The optical waveguide may also be placed on the layer such that it is embedded in the layer. The optical waveguides should be positioned such that they will be aligned with their optical components when the finished alignment carrier structure is positioned over the electronic substrate.

After the next layer is formed it is positioned over the first carrier layer and its optical waveguides so that the optical waveguides are sandwiched between the two alignment carrier structure layers. The preceding steps are then repeated to form as many layers as are desired. The last optical waveguide need not be covered by a carrier layer if a ridge waveguide is desired.

The final process step is bonding the carrier layers together. This step necessarily varies with the materials used for the carrier layers and the optical waveguides. For example, an adhesive may be applied to the outside edges of the alignment carrier structure. Alternatively, the carrier layers may be internally self-adhesive. Of, if the carrier layers are formed by partial polymer curing, they may be completely cured as the last step to bond the layers.

Finally, in applications where light must travel from one electronic substrate to another, the optical waveguides on each electronic substrate may be butt coupled with optical fiber connecting the two electronic substrates.

While the present invention has been particularly described in conjunction with specific preferred embodiments, it is evident that many alternatives, modifications, and variations will be apparent to those skilled in the art in light of the foregoing description. It is therefore contemplated that the appended claims will embrace any such alternatives, modifications, and variations as falling within the true scope and spirit of the present invention.

What is claimed is:

1. An optical signal distribution system comprising:
    a) an electronic substrate having a principal surface;
    b) at least one optical component on said principal surface of said electronic substrate; and
    c) at least one optical waveguide nonintegrally formed on said principal surface but distinct from said electronic substrate through which an optical signal may be passed to or from said optical component.

2. The optical signal distribution system in claim 1 wherein said electronic substrate acts as an alignment carrier structure for said waveguide.

3. The optical signal distribution system in claim 1 wherein said optical waveguide is directly on but not bonded to said substrate.

4. The optical signal distribution system in claim 1 wherein said optical waveguide overlays electrical wiring on said principal surface of said substrate.

5. The optical signal distribution system in claim 1 wherein said optical waveguide is selected from the group of materials consisting of glass, polyacrylate, polycarbonate, polystyrene and polyimide.

6. The optical signal distribution system in claim 5 wherein said optical waveguide is a polyacrylate material.

7. The optical signal distribution system in claim 6 wherein said polyacrylate is polymethyl methacrylate.

8. The optical signal distribution system in claim 1 further comprising an alignment carrier structure nonintegrally formed on but distinct from said substrate comprised of at least one layer on or within which is placed said optical waveguide.

9. The optical signal distribution system in claim 8 wherein said alignment carrier structure is shaped in a grid-like pattern for placement between a grid-like pattern of integrated circuit chips.

10. The optical signal distribution system in claim 8 wherein said optical waveguide comprises metal-reflectorized voids formed within said alignment structure.

11. The optical signal distribution system in claim 8 wherein said waveguide is applied as a ridge directly on the top or bottom surfaces of said alignment carrier structure.

12. The optical signal distribution system in claim 8 wherein said waveguide is embedded in channels formed within said alignment carrier structure.

13. The optical signal distribution system in claim 8 wherein said alignment carrier structure comprises a plurality of layers and said waveguide is enclosed between the layers of said alignment carrier structure.

14. The optical signal distribution system in claim 8 wherein said alignment carrier structure overlays electrical wiring on said principal surface of said substrate.

15. The optical signal distribution system in claim 8 wherein said layers of said alignment structure are selected from the group of materials consisting of polymer, metal and glass.

16. The optical signal distribution system in claim 8 wherein directional optical couplers are formed in the alignment carrier structure.

17. The optical signal distribution system in claim 1 wherein said optical waveguide is a decal.

18. A method of forming an optical signal distribution system of the type comprising an electronic substrate having a principal surface and at least one optical component on the principal surface, the method comprising the step of placing at least one preformed optical waveguide onto the principal surface of the electronic substrate wherein an optical signal may be passed to or from the optical component through said optical waveguide.

19. The method of claim 18 wherein the optical signal distribution system further comprises a plurality of optical waveguides and an alignment carrier structure having a plurality of layers on or within which is placed said optical waveguides, the method further comprising the steps of: forming said alignment carrier structure according to the following steps:
 a) forming a first carrier layer;
 b) positioning at least one optical waveguide on or within said first carrier layer;
 c) forming a next carrier layer;
 d) positioning said next carrier layer over said first carrier layer and said optical waveguide;
 e) repeating steps b, c and d as necessary to form the desired alignment carrier structure; and
 f) bonding said carrier layers together; and
placing said alignment carrier structure on the principal surface of the electronic substrate.

* * * * *